United States Patent [19]
Tipman

[11] 3,880,647
[45] Apr. 29, 1975

[54] HYDRO METALLURGICAL PROCESS FOR COPPER RECOVERY

[76] Inventor: Norman Robert Tipman, 90 Tyndall Ave., Apt. 804, Toronto, Ontario, Canada

[22] Filed: Dec. 6, 1973

[21] Appl. No.: 422,590

[52] U.S. Cl.................. 75/.5 A; 75/108; 75/117; 148/6.14 R
[51] Int. Cl............................................ C22b 15/12
[58] Field of Search................. 75/.5 A, 117, 108; 148/6.14 R

[56] References Cited
UNITED STATES PATENTS

| 870,786 | 11/1907 | Jamau................................. 75/108 |
| 1,201,899 | 10/1916 | Werdlein........................... 75/108 X |
| 3,337,555 | 8/1967 | Billman et al..................... 75/108 X |
| 3,428,448 | 2/1969 | Bank et al......................... 75/117 X |

FOREIGN PATENTS OR APPLICATIONS
1,196,507   6/1970   United Kingdom................... 75/108

Primary Examiner—Herbert T. Carter
Attorney, Agent, or Firm—Ernest Peter Johnson

[57] ABSTRACT

The invention is an improvement on the known process wherein copper values present in an aqueous copper sulphate solution are reduced with sulphur dioxide at elevated temperature and pressure and precipitated as copper powder.

A catalyst, either dimethyl sulphoxide or dimethyl formamide, is provided in the copper sulphate solution in an amount between 0.5 and 2.0 % by weight of the solution. Copper yields are increased as a result.

The copper product comprises hexagonal platelets capable of passing through a −325 mesh screen.

6 Claims, 2 Drawing Figures

HYDRO METALLURGICAL PROCESS FOR COPPER RECOVERY

BACKGROUND OF THE INVENTION

The present invention relates to a hydrometallurgical process for reducing copper values, present in an aqueous copper sulphate solution, with sulphur dioxide to precipitate elemental copper powder.

It is known that copper can be precipitated from a copper sulphate solution which is saturated with sulphur dioxide when the solution is heated under pressure. The reaction is represented by the following equation:

$$CuSO_4 + SO_2 + 2H_2O \rightarrow Cu° + 2H_2SO_4$$

U.S. Pat. No. 870,786, issued to Jamau, broadly describes this process. U.S. Pat. No. 1,201,899, issued to Weidlein, teaches carrying out the reduction process at a specific temperature and pressure. Weidlein reacts the copper sulphate solution with sulphur dioxide at 150°C and 100 p.s.i.

When the reduction is practiced in accordance with the prior art, the yield of elemental copper is low. Recoveries rarely exceed 50% by weight of the copper in solution. This is probably due to an inhibiting effect of the sulphuric acid which is produced during the reduction.

In addition, the copper particles which are obtained are sub-micron in size and are therefore easily oxidized; this is an undesirable quality.

SUMMARY OF THE INVENTION

It is an object of this invention to improve the reduction process described to increase the yield of elemental copper.

It is another object to improve the reduction process to produce a copper powder product of low surface area and good size which is not easily oxidized.

In accordance with the invention, at least one catalyst compound, selected from the group consisting of dimethyl sulphoxide and dimethyl formamide, is provided in the copper sulphate solution to be subjected to reduction. The compound is provided in an amount between 0.5 and 2.0% by weight of the solution. Preferably, it is provided in an amount of about 1% by weight of the solution so as to provide about 1 mole of catalyst per mole of copper in solution.

It is observable that the use of the catalyst results in three improvements. These are:
1. an increase in the yield of copper powder;
2. a lowering of the temperature needed to start the reduction; and
3. a change in the physical characteristics of the product powder.

More particularly, the copper recovery is increased from about 50% to about 75% in most cases.

The temperature at which reduction commences is lowered to about 90°C. This minimizes contamination by iron and oxygen, which occurs at higher temperatures.

The product powder particles are mainly hexagonal platelets having six side edges and two main surfaces. These platelets appear to be single crystals which have smooth surface, thereby indicating a low surface area. Powder particles having a size of +120 mesh can be produced by the practice of the process. The powder is easily compacted and can be fabricated into rolled or extruded forms which are competitive in properties to those made from other types of copper powder.

To illustrate the foregoing points (1) and (2), reductions with and without catalysts were carried out in an autoclave under identical conditions with the following results:

TABLE I

| Reduction time: | 90 minutes |
|---|---|
| $SO_2$ pressure: | 80 p.s.i.g. |
| Initial reduction temperature: | 90°C |
| Initial concentration: | 20 g.p.l. aqueous $CuSO_4$ solution |

| Test | Chemical Added | Concentration g.p.l. | Recovery Percent | Final Reduction Temp. °C |
|---|---|---|---|---|
| 1 | None | | 40 | 120° |
| 2 | Dimethyl Formamide | 10 | 75 | 120° |
| 3 | Dimethyl Sulphoxide | 10 | 70 | 120° |

According to another feature of the invention, the reduction is preferably terminated at a temperature less than about 130°C. If the reduction reaction, which is exothermic, is allowed to go to higher temperatures, the product powder is found to be excessively fine and is discoloured with impurities such as iron and copper oxide.

According to still another feature, sulphur dioxide gas is introduced into the reduction autoclave, preferably before the temperature of its contents reaches 90°C. I find that, if the sulphur dioxide is not added until the Temperature of the autoclave contents is above 90°C, a fine product powder which is discoloured with impurities is obtained.

According to another feature, the pH of the leach end solution fed to the autoclave preferably should be lower than 4.0. If the pH is higher, some of the copper sulphate precipitates as copper hydroxide.

DESCRIPTION OF THE DRAWINGS

In the drawings which illustrate the invention.

DESCRIPTION OF THE PREFERRED EMBODIMENT

Figure 1:
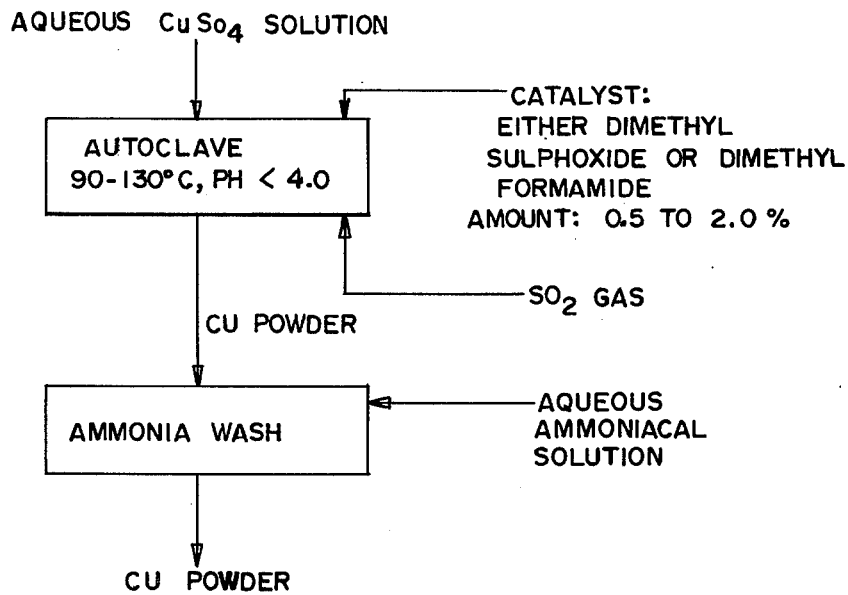
FIG. 1 is a flow diagram of the process.
Figure 2:
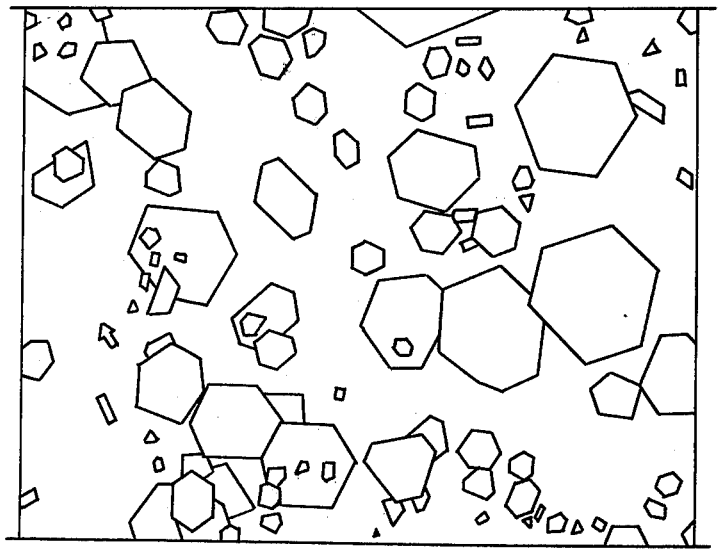
FIG. 2 is a fanciful representation of the product of the process, magnified 160 times.

The invention involves improvements of a known process. According to this process, copper sulphide ore is concentrated and then roasted under oxidizing conditions to convert the copper sulphides to copper oxides and copper sulphates. This is conventionally done in a fluidized bed by passing air through the bed while maintaining the bed's temperature at about 650°C. A by-product of this step is sulphur dioxide gas which can be subsequently used in the reduction step. The roasted concentrate is then leached in aqueous solution containing about 40 – 50 g.p.l. $H_2SO_4$ for about 3 hours at about 70°C to dissolve the copper values as copper sulphate.

A typical leach solution has the following composition:

TABLE II

| Constituent | grams per litre |
| --- | --- |
| Cu | 25 |
| catalyst | 15 |
| H$_2$SO$_4$ | 10 |
| other sulphates | 60 |

If necessary, the leach end solution is neutralized with lime to reduce the pH to about 3.5. Some ferrous sulphate in solution precipitates during this operation. The solution is then filtered to remove solids and pumped to the reduction step.

The leach end solution is reduced in a conventional hydrometallurgical autoclave equipped with an agitator. This step is exemplified by the following examples:

Example I

This example shows the effect of dimethyl formamide addition to the reduction.

143.5 pounds of leach liquor containing 21.4 g.p.l. cupric ion, 20.6 g.p.l ferric ion and 5 g.p.l. sulphuric acid were placed in a 20 gallon autoclave. 2.5 pounds of dimethyl formamide were added to the liquor. The autoclave was closed and the trapped air purged with sulphur dioxide gas. The autoclave contents were then heated to 70°C with agitation, at which time sulphur dioxide gas was admitted to raise the pressure to 30 p.s.i. The temperature was increased to 90°C, at which time consumption of sulphur dioxide began. At this time the sulphur dioxide pressure was immediately increased to 80 p.s.i. and maintained there throughout the reduction. The temperature slowly rose over a period of 95 minutes to a final temperature of 125°C, at which time sulphur dioxide consumption ceased.

The copper product was recovered from the autoclave and washed with water to remove residual sulphuric acid. It was then washed in water containing 0.1% by weight ammonia to neutralize residual sulphuric acid. As a result of this operation, a protective copper - ammonia complex was formed, which reduced surface oxidation and preserved the bright metallic appearance of the product.

After neutralizing, the powder was washed with n-propyl alcohol and vacuum dried.

Analysis of the autoclave solution showed that 4.5 grams/litre copper remained in the solution. 2.43 pounds of metallic copper was removed for a recovery of 79%. The iron content of the solution remained at 20.6 grams/litre and the sulphuric acid content had risen to 41 grams/litre.

The product powder had the following compositions:

| Constituent | Weight percent | Constituent | Weight percent |
| --- | --- | --- | --- |
| Mn | *.01 | Al | 0.1 |
| Sb | *.01 | V | .01 |
| Mg | *.01 | Ag | .006 |
| Mo | .05 | Zn | *.01 |
| W | *.01 | Ti | *.01 |
| Pb | .2 | Ni | *.01 |
| Sn | *.01 | Zr | *.01 |
| Cr | *.01 | Co | *.01 |
| Si | .04 | Sr | *.01 |
| Fe | .2 | O | .45 |
| Bi | *.01 | Cu | balance |

The product powder had the following typical screen analysis:

| Tyler Sieve No. | Percent retained |
| --- | --- |
| 80 | — |
| 120 | — |
| 170 | 1 |
| 230 | 1 |
| 325 | 5 |
| Pan | 93 |

Further work has shown that particle size is governed by the rate of stirring. Larger particles can be produced by reducing the rate of stirring.

EXAMPLE II 130 pounds of leach liquor containing 18 g.p.l. cupric ion, 18 g.p.l. ferric ion and 5 g.p.l. sulphuric acid were placed in a 20 gallon autoclave. 2.5 pounds of dimethyl sulfoxide were added to the liquor. The autoclave was closed and the trapped air purged with sulphur dioxide gas. The autoclave contents were then heated to 70°C with agitation, at which time sulphur dioxide gas was admitted to raise the pressure to 30 p.s.i. The temperature was increased to 90°C, at which time consumption of sulphur dioxide began. At this time the sulphur dioxide pressure was gradually increased to 80 p.s.i. and maintained there throughout the reduction. The temperature slowly rose over a period of 95 minutes to a final temperature of 125°C, at which time sulphur dioxide consumption ceased.

The copper product was recovered from the autoclave and washed with water to remove residual sulphuric acid. It was then washed in water containing 0.1% by weight ammonia to neutralize residual sulphuric acid. As a result of this operation, a protective copper - ammonia complex was formed, which reduced surface oxidation and preserved the bright metallic appearance of the product.

After neutralizing, the powder was washed with n-propyl alcohol and vacuum dried.

Analysis of the autoclave solution showed that 5.0 grams/litre copper remained in the solution. 1.7 pounds of metallic copper was removed for a recovery of 73%. The iron content of the solution remained at 20 grams/litre and the sulfuric acid content had risen to 38 grams/litre.

The product powder had a composition and screen analysis similar to the product of example I.

What is claimed is:

1. In a method for recovering copper from copper sulphides wherein the sulphides are roasted to convert them to oxides and sulphates, the product is leached in sulphuric acid to form an aqueous copper sulphate solution, and the copper content of the solution is reduced and precipitated from the solution as elemental copper powder using sulphur dioxide at elevated temperature and pressure, the improvement which comprises:

providing at least one catalyst, selected from the group consisting of dimethyl sulphoxide and dimethyl formamide, in the copper sulphate solution to be subjected to reduction in an amount between 0.5 and 2.0% by weight of the solution.

2. The method of claim 1 wherein:
   the product copper powder is contacted with an aqueous ammonia solution of about 1% concentration by weight to form a copper-ammonia complex protective coating.

3. A method for precipitating copper powder from an aqueous copper sulphate solution which comprises:

providing between 0.5 and 2% by weight of catalyst within the solution, said catalyst comprising at least one compound selected from the group consisting of dimethyl sulphoxide and dimethyl formamide;

heating the product solution in an autoclave while maintaining an over pressure with sulphur dioxide gas within the autoclave to reduce the copper values and precipitate copper powder; and terminating the reduction at a temperature below 130°C.

4. The method of claim 3 wherein:

the sulphur dioxide is introduced into the autoclave when the temperature of the autoclave contents is between about 60°C and 90°C.

5. The method of claim 4 wherein:

the product copper powder is contacted with an aqueous ammonia solution of about 1% concentration by weight to form a copper-ammonia complex protective coating.

6. The method of claim 3 wherein:

the product copper powder is contacted with an aqueous ammonia solution of about 1% concentration by weight to form a copper-ammonia complex protective coating.

* * * * *